United States Patent [19]

Lever

[11] 4,000,443
[45] Dec. 28, 1976

[54] VOLTAGE CONTROL

[75] Inventor: Robert Charles Lever, Feltham, England

[73] Assignee: Volstatic Coatings Limited, England

[22] Filed: July 26, 1974

[21] Appl. No.: 492,144

[30] Foreign Application Priority Data

July 26, 1973 United Kingdom ............ 35589/73

[52] U.S. Cl. .................................. 317/3; 317/9 D; 317/33 VR; 321/14; 321/15
[51] Int. Cl.² ........................................ B05B 5/02
[58] Field of Search ................. 317/3, 9 D, 22, 31, 317/33 VR, 36 TD, 57; 321/2, 11, 12, 13, 14, 15, 18; 323/4, 9

[56] References Cited

UNITED STATES PATENTS

| | | | |
|---|---|---|---|
| 3,280,374 | 10/1966 | McCartney et al. | 323/9 X |
| 3,327,199 | 6/1967 | Gardner et al. | 321/18 X |
| 3,337,787 | 8/1967 | Joseph | 321/15 X |
| 3,533,010 | 10/1970 | Bowles | 321/15 X |
| 3,544,844 | 12/1970 | Pellegrino | 317/31 X |
| 3,564,384 | 2/1971 | Adler | 321/18 X |
| 3,693,043 | 9/1972 | Wedham | 323/4 X |
| 3,702,434 | 11/1972 | Ryan | 321/18 X |
| 3,840,797 | 10/1974 | Aggen et al. | 321/2 |
| 3,872,370 | 3/1975 | Regnault | 317/3 |
| 3,893,006 | 7/1975 | Algeri et al. | 317/3 |

*Primary Examiner*—A. D. Pellinen
*Attorney, Agent, or Firm*—Shapiro and Shapiro

[57] ABSTRACT

In operation of an electrostatic spray gun through a low-valued series resistor, a circuit is employed providing voltage regulation to maintain the ionization current substantially constant. This is achieved through a feedback loop providing negative feedback to a voltage regulator so that as the current tends to increase, the voltage is reduced. The circuit provides an oscillator driven amplifier feeding a voltage rectifier and multiplier to drive the gun; the voltage regulator controlling the voltage output of the amplifier and thereby of the gun.

16 Claims, 5 Drawing Figures

FIG.2.

VOLTAGE CONTROL

The present invention relates to an electrostatic spray gun and to a power supply arrangement therefor.

It is an object of the present invention to provide such electrostatic spraying apparatus which enables the electrode of the gun to be operated under a voltage such as to prevent the risk of a dangerous discharge taking place from the electrode should it be shorted to earth during the use of the gun.

It will be understood that by "dangerous" is meant that the energy of the discharge from the electrode to earth is sufficient to cause the user of the gun a severe shock if the earthing is by contact of the electrode with the user or to cause the material being sprayed to ignite if the earthing is by contact of the electode with the article being sprayed or by too close a proximity of the electrode to the article.

It has been proposed to limit the maximum current available from the electrode by the provision of a resistor in series with the power supply, the value of such resistor being between 2 and 5 Megohms per Kilovolt of supply voltage. Thus, for a 100 Kv supply the series resistor may be as high as 500 Mohm. Such high resistance values lead to wide fluctuations of electrode voltage as the ionisation current flowing from the electrode varies when the spray gun is moved around in the vicinity of an earthed object.

It has been proposed to use a series resistor of considerably lower value coupled with an EHT generator in the form of an electronic oscillator feeding into a voltage multiplier, which generator is provided with means which monitors the ionisation current and switches off the generator when this current exceeds a predetermined value, a delay device being provide which permits generator operation to be restored after a predetermined period. The oscillator is designed to operate in the radio frequency range (10 to 100 Kilohertz) so that output capacitance is small thus avoiding dangerous storage of energy.

However, it has been realised that this arrangement may have a drawback in that the spray gun ceases to operate for a few seconds each time ionisation current exceeds the predetermined danger value.

An aim of the invention therefore is to provide electrostatic spray apparatus in which the output EHT voltage is reduced in inverse proportion to an increase in the instantaneous value of th e ionisation current, without the introduction of delays in voltage build-up after removal of a short circuit.

Accordingly the invention provides a circuit for supplying an electrostatic spray gun with a rated high-tension voltage through a resistance preferably having a value of from 0.17 to 0.3 Mohms per kilovolt of the rate voltage, the circuit comprising a variable high-tension generator and means, responsive to the current drawn by the spray gun, for varying the voltage output of the generator inversely with the instantaneous value of the current drawn by the gun.

It has been found that the arrangement of the invention provides what is almost a constant source of ionisation current until the spray gun electrode is touching or almost touching an earthed object. A pulse of current is then produced which may be made useof as a signal to operate an overload control circuit to cut off power until the gun is withdrawn from the object.

The generator may comprise a radio-frequency oscillator, for instance, operating at a frequency of 10 to 100 KHz; a tuned output, push pull amplifier and a voltage multiplier and rectifier; the oscillator and the amplifier being connected across a common potential supply and the oscillator being connected to the amplifier to drive the amplifier, and the amplifier being connected to the voltage multiplier through a transformer coupling. The oscillator may be formed as a separate unit for plug-in connection to the remainder of the generator.

The means for varying the generator voltage may comprise a voltage regulator and means for sensing any change in the instantaneous value of the current drawn by the gun to produce a signal representative of the change: the voltage regulator being arranged to respond to the signal to provide the requisite voltage regulation of the generator.

In using the generator comprising the oscillator driven amplifier, the current sensing means may comprise a feedback loop from the output of the amplifier to the voltage regulator; the loop including an amplifier for the signal to increase the sensitivity of the response of the regulator to changes in the instantaneous value of the current drawn by the gun.

In a further aspect of the invention, an overload control such as disclosed above, may also be provided which will only come-in in response to the instantaneous ionisation current at a pre-determined level which would obtain only if a failure has occured in the oscillator control, or a contact or near contact of the gun with an earthing object has been made. Thus, an additional safeguard is provided.

The current sensing means and the overload control may be constituted as separate circuits for plug-in connection to the E.H-T generator.

The invention will now be described, by way of example only, with reference to the accompanying drawings in which a presently preferred embodiment of the invention is illustrated and in which.

Figure 1:
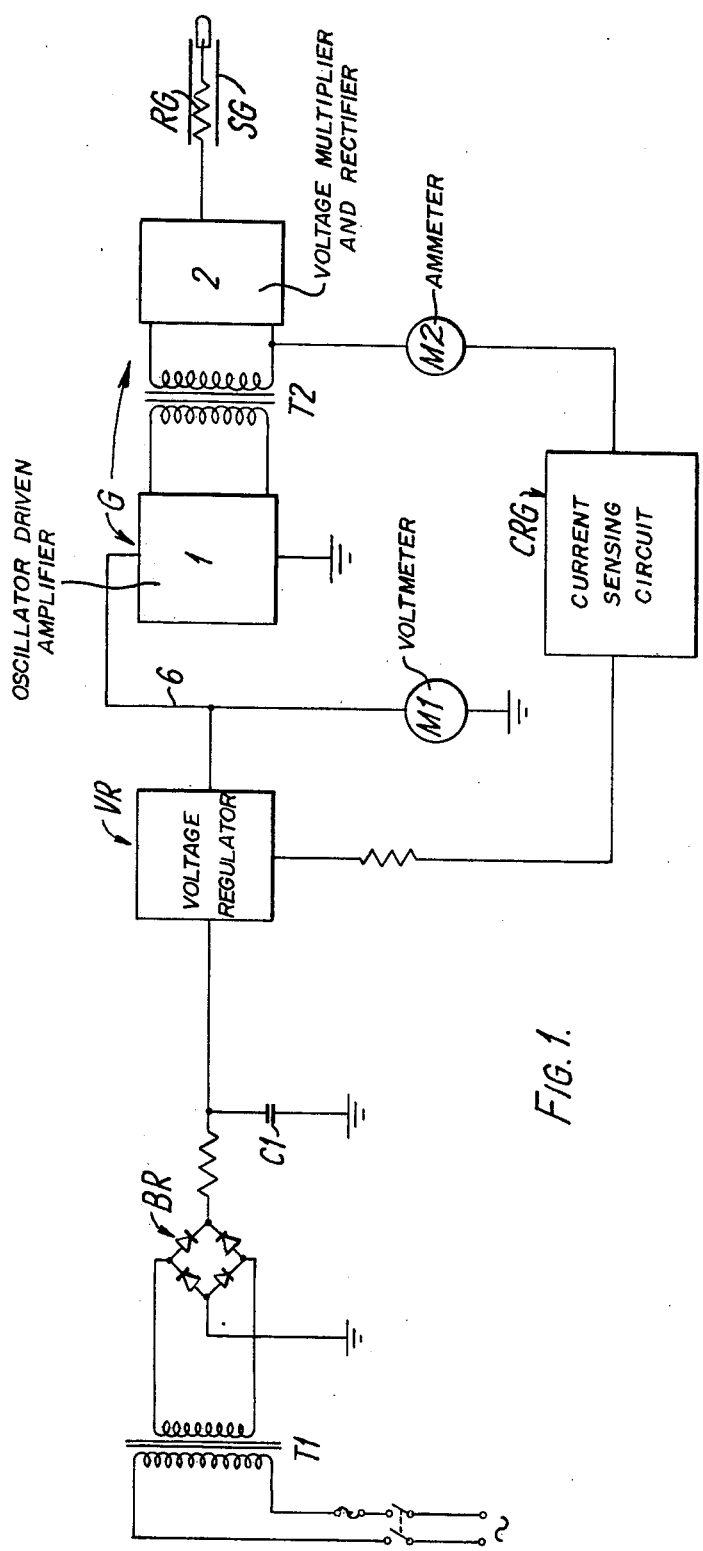
FIG. 1 is a diagrammatic drawing of the circuit of the embodiment connected to a spray gun.
Figure 3:
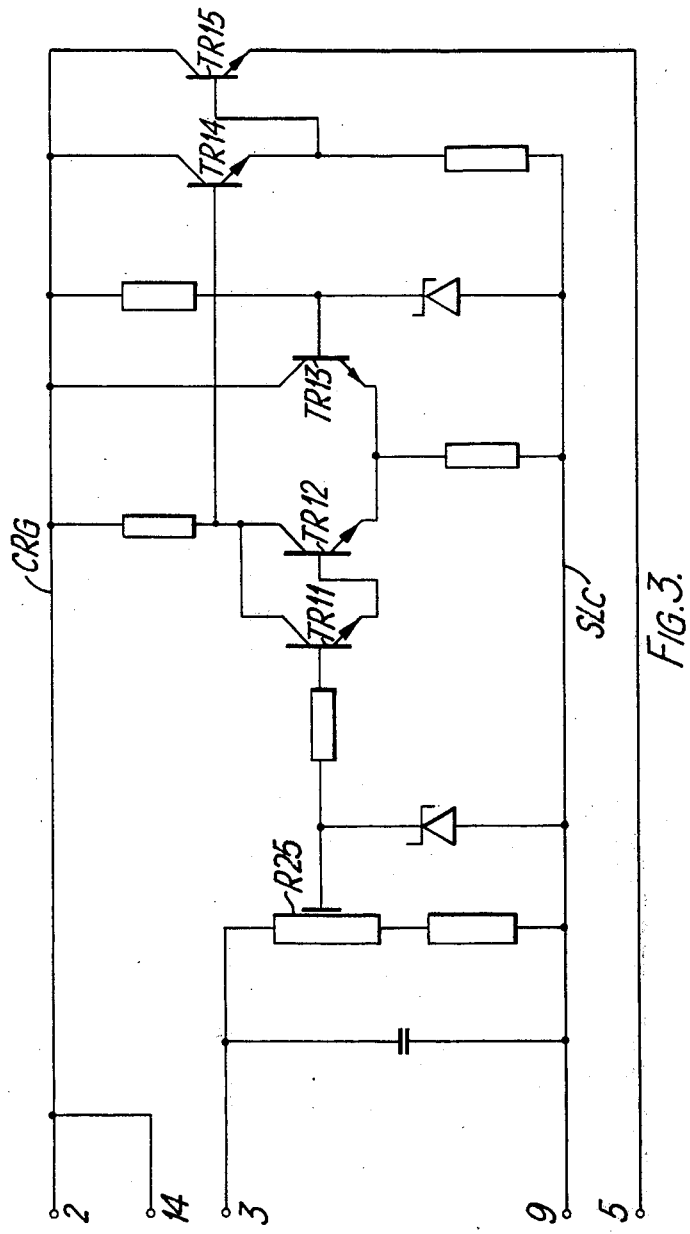
FIG. 3 is a diagram of a current sensing circuit being the part not shown in FIG. 2.

Referring to FIG. 1, the circuit generally comprises a mains supplied, full-wave bridge rectifier BR, and E.H-T generator G, a voltage regulator VR, and a current sensing circuit CRG (FIG. 3). The circuit of the embodiment, may also employ an overload control circuit OC (FIG. 4) as will be made evident below. The output of the generator is connected to the gun SG which comprises a resistance RG preferably of a value of 0.17 to 0.3 Mohms per kilovolt of the rated voltage of the generator. An exemplary value of the rated voltage of the generator is 60 KV.

Figure 2:
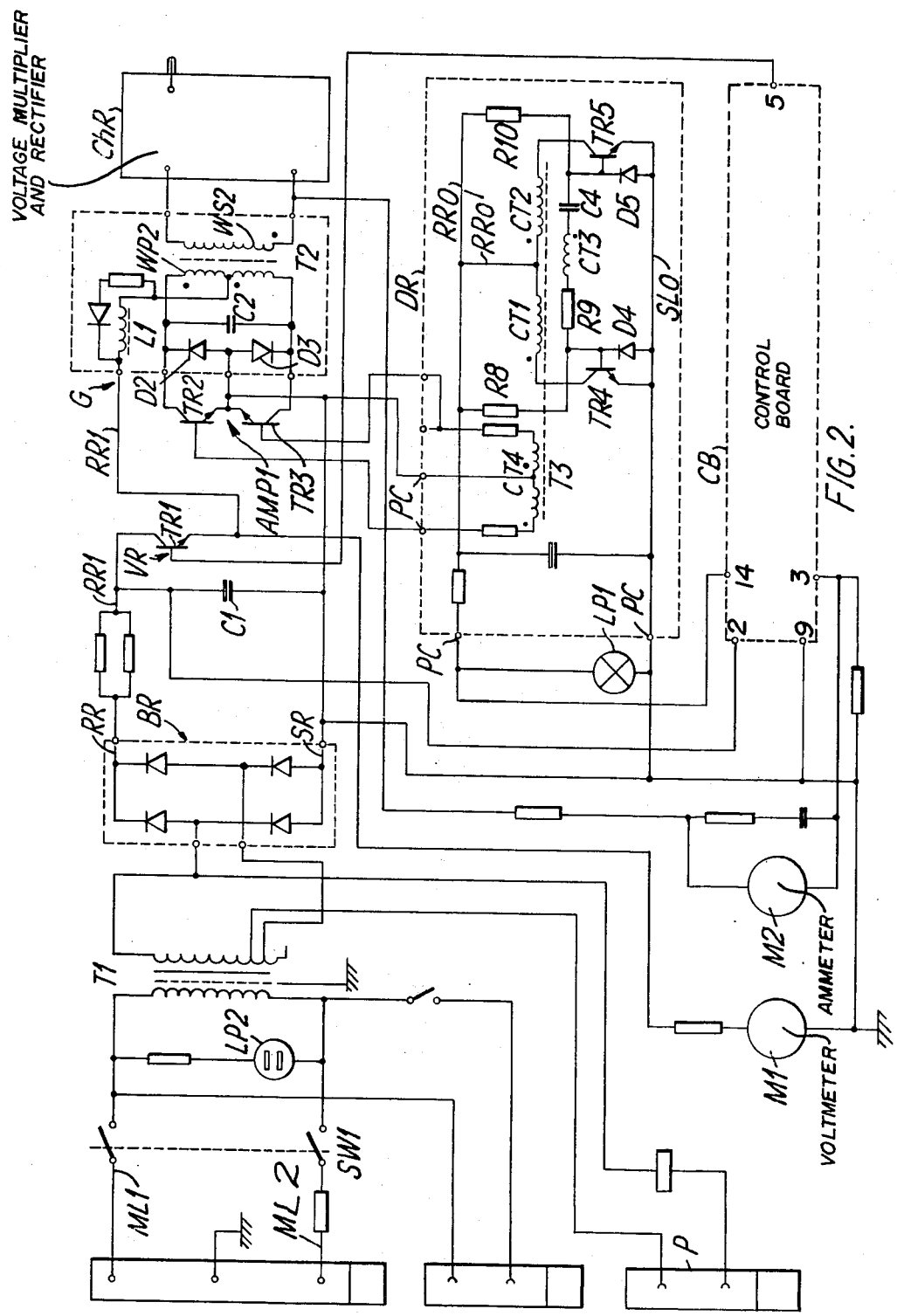
FIG. 2 is a circuit diagram of part of the embodiment.

The current sensing circuit and the overload control circuit, may be made up as plug-in units to the generator which accordingly may comprise a control board providing terminal connections for those circuits. Referring to FIG. 2, the control board CB is indicated in broken line and is adapted to receive both the current sensing circuit and the overload control circuit although, for convenience of representation, only one set of terminal connections is shown. The terminals are numbered respectively 2, 3, 5, 9 and 14, and like reference numerals are employed in FIGS. 3 and 4 to indicate the corresponding terminals of the two circuits respectively shown therein. To permit the generator to operate when neither of the circuits of FIGS. 3 and 4 is connected in the control board, a plug as shown in FIG. 5 may be connected in the control board to cross connect terminals of the board as indicated by the reference numerals shown in the Figure.

Figure 4:
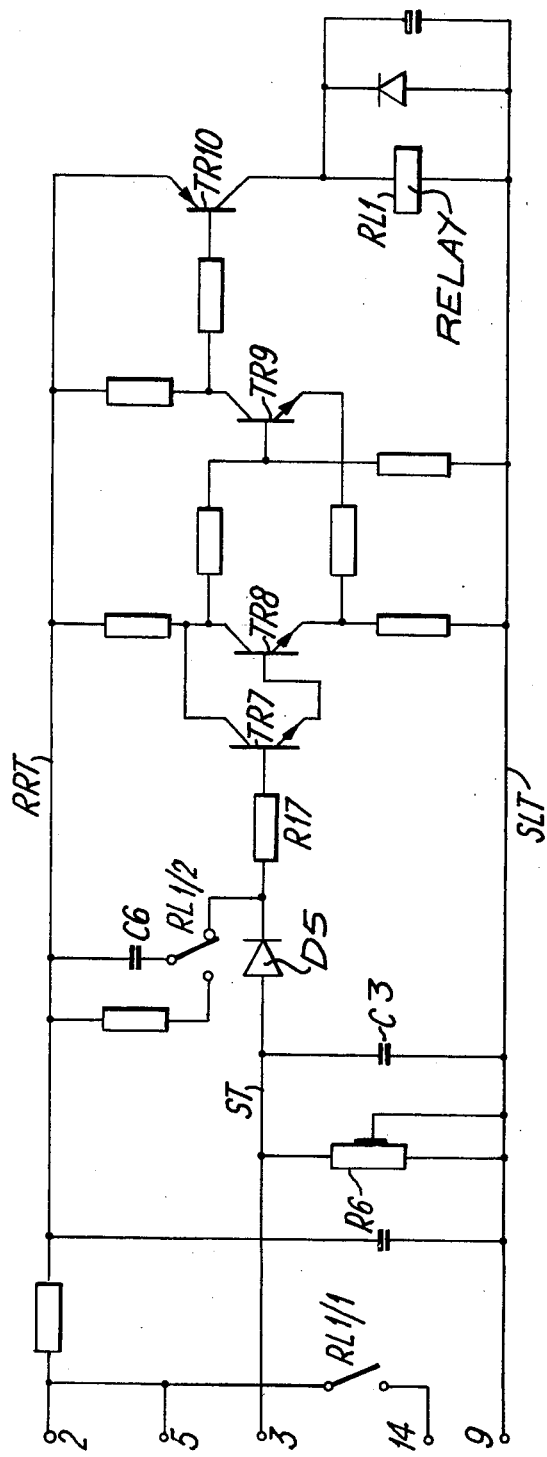
FIG. 4 is a diagram of an overload control circuit for use with the embodiment of FIGS. 2 and 3.
Figure 5:
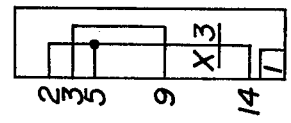
FIG. 5 is a diagram of a part which may be used with the circuit of FIG. 2.

In the description below, it will be assumed that both the circuits of FIGS. 3 and 4 are plugged into the control board CB.

Referring again to FIG. 2, the generator G comprises a voltage multiplier and rectifier ChR which may be a CockroftWalton device, fed through a transformer T2 from an oscillator-driven amplifier AMP1; the amplifier being driven to operate under class D to give low-power dissipation and at a frequency of, for instance, 25 KHz. The amplifier is a push-pull amplifier constituted by transistor pair TR2, TR3 with a collector output in the form of a centre-tapped coil constituting the primary winding WP2 of the output transformer T2; the centre tap being connected to the return rail RR of the rectifier through a lead RR1. The amplifier also comprises diodes D2, D3, to provide current steering on alternate conduction of the transistors TR2, TR3. A secondary WS2 of the output transformer is connected to the voltage multiplier in which the voltage developed across the secondary is rectified and multiplied to give the required high tension voltage for operating the spray gun.

The primary winding inductance of the transformer T2 is tuned by the combined effects of secondary capacitance and equivalent multiplier capacitance. In order to achieve controlled inductance values in the transformer, the secondary winding is arranged by single wave winding, with the inner end located at earth potential, thereby simplifying insulation problems. The sharpness or Q value of the tuned circuit increases as the winding inductance is decreased by alteration of the ferrite gapping in the core of the transformer and a compromise has to be made between flatness of tuning and higher output voltages from the multiplier. If the tuning is too sharp, high peak collector currents will be demanded when small excursions from the resonant frequency occur. In order to shape the output waveform, an inductor L1 is provided in the lead RR1. In the absence of this inductor a square wave voltage would be produced which, if applied to the secondary capacitance, would result in high peak currents flowing in the transistors TR2, TR3. The waveform shaping of L1 effectively overcomes this problem. The secondary winding is wound over the primary to ensure good coupling. This is necessary in order to keep the voltage transients that are generated during the switching interval to a minimum. Capacitor C2, which is small compared with the secondary capacitance, has been added to attenuate these transients further.

Many silicon switching transistors are now available which meet the requirements of the above-described output stage. For instance, transistors with a collector/emitter voltage rating of 100v when the base/emitter junction is reverse biassed, would serve, and a collector peak current rating of approximately 5 amperes is ideally suited for the purpose of the present invention.

A typical characteristic for a suitable power transistor, for instance, A BDY25, is indicated below:

Max. collector/emitter voltage $V_{ceo} = 140v$
Max. collector/current $I_c = 6$ amperes If heat sink dimensions are to be kept reasonably small the efficiency of the power amplifier must be high. In order to acheive increased efficiency the switching transistors should have a low saturated collector/emitter voltage. This characteristic directly affects the hold on loss: furthermore, rise and fall times must be kept to a minimum. Again for the above-mentioned transistor:

Max saturation voltage $V_{ce}$ (Sat) = 0.6 at
$I_c =$ 2A
$I_b =$ 0.25A
Max rise time $t_r = 0.5$ $uS$
Max fall time $t_f = 1$ $uS$ The voltage regulator VR controls the voltage drop across the amplifier AMP1; the regulator being connected in the return lead RR to the bridge and comprising a transistor TR1. The transistor functions as a common base amplifier and is fed from voltage signals developed by the current sensing circuit as will be described hereinbelow.

It is known that the collector of a common base amplifier functions as an excellent constant-current regulator because of its relatively high output impedance. The nature of this amplifier is such that if the value of emitter current is fixed, a collector current equal to $hfb$ ($\alpha$) times the emitter current is produced. This current is maintained constant even though the applied voltage or the collector load resistance may be varied. Such a constant-current regulator has been found to be ideally suited for high voltage supplies for electrostatic spraying in accordance with the invention, inasmuch as the output voltage must be reduced when the spray gun approaches earth potential. It also has the advantage of maintaining a constant field current. With this form of control, high resistance elements normally used in the spray gun can be eliminated. In a 100 kilovolt power supply for instance, a total output series resistance of only 20 megohms is necessary, against the normal requirement of 500 megohms or more when used with a non-regulated supply.

A further advantage of utilising low series resistance values in the output load, is the improvement in voltage regulation of the output. Consider, for example, a typical 100 kilovolt unregulated supply which has a series resistance of 1000 megohms feeding the electrode spray gun, and assume an average ionisation current of 50 microamperes. The voltage drop across the series resistance is thus 50,000 volts.

In this case, the effective working voltage applied to the spray gun will be 50% less than the input voltage supplied from the generator.

In contrast, the same generator with a series resistance of 20 megohms will experience a voltage drop of only 1000v., resulting in much higher efficiencies. Thus, it may be expected that a power supply producing say 60 kilovolts with a low internal resistance of 20 megohms, will produce similar field strength at the spray gun, equivalent to a 100Kv supply with a high internal resistance.

The amplifier AMP1 is driven by an oscillator DR (shown within a broken line box in FIG. 2) which is a CR capacitance-resistance -timed square wave inverter comprising transistor pair TR4, TR5 with collector outputs in the form of respective coils CT1, CT2 constituting the primary windings of an output transformer T3. From these windings alternately, feedback is taken to the base circuit of the oscillator; the base circuit being formed by a timing capacitor C4 and a coil CT3, and timing resistor R9 and start-up resistors R8 and R10. The output signal from the oscillator is also reflected into a further secondary coil CT4 connected to the respective bases of transistor TR2, TR3 of amplifier AMP1; the coil being connected at a centre tap to the negative rail SR of the rectifier. The junction between the coils CT1, CT2 is returned via leads RRo' to the positive line RRo of the oscillator to which the respective ends of resistors R8, R10 are also connected. The circuit also comprises diodes D4, D5 connected between negative line SLo of the oscillator and the bases of the respective transistors TR4, TR5 to prevent the negative bias, developed on the base of transistors TR4 and TR5 when not conducting, from reaching the breakdown voltage. The oscillator may also be formed as a plug-in unit to the remainder of the generator as indicated by the terminal connectors PC shwon in FIG. 2.

The frequency determining resistor R9 needs to be adjusted in order to allow for the spread in the base/emitter characteristics of transistor TR4 and TR5. Resistors R8 and R10 provide a small DC bias current for each transistor base, thus ensuring immediate oscillator start. At the time of switch-on, the highest gain transistor in the oscillator pair will conduct and the positive feedback action of the oscillator transformer will then ensure rapid turn-on of that transistor.

The current sensing circuit of FIG. 3 comprises an adjustable resistor R25 the line terminals of which are connected between the negative line SIc of the circuit and terminal 3; the terminal 3 being connected to the secondary WS2 of the output transformer T2. Current variations in the secondary WS2 are therefore reflected across the resistor as a voltage signal a proportion of which is picked off by the movable terminal of adjustable resistor R25 and is applied to the transistor TR1 constituting the voltage regulator, through a D.C. amplifier, comprising transistors TR11, 12, 13, 14 and 15, to increase the sensitivity of the drive to the voltage regulator. The transistors TR11 and 12 form a high-gain pair feeding the transistor pair TR14 and 15 to vary the conduction of the latter inversely with the signal developed across resistor R25 and thus vary the output voltage of the generator inversely with the current drawn by the gun.

The overload control circuit of FIG. 4 comprises a Schmitt trigger connected between supply line SLT and return line RRT, the trigger consisting of transistor pair TR8, TR9 together with an input signal amplifier constituted by transistor TR7 forming with transistor TR8 a high gain Darlington pair. The base of transistor TR7 is connected, through resistor R17, diode D5 and lead ST, to a terminal 3 for connection to the secondary WS2 of the output transformer T2; and a capacitor C3 and an adjustable resistor R6 are connected between the lead ST and the negative line of the overload control circuit the resistor R6 developing the triggering signal across it and capacitor C3 preventing voltage spikes in the mains supply from accidentially firing the trigger. An ammeter M2 (FIG. 2) may be connected in parallel with the lead ST so that the current being drawn by the voltage multiplier ChR may be read. When power is supplied to the circuit, the transistors TR7, TR8 are normally off and transistor TR9, together with a further transistor TR10, normally on. The transistor TR10 is a medium power driver for a relay RL1 provided to control contacts RL1/1 connected in the positive line to the oscillator circuit through terminal 14. Transistor TR9, when conducting, applies a conducting bias to the base of transistor TR10 through which current is drawn to sustain the relay RL1 and hold contacts RL1/1 in the return line RR0 of the oscillator closed.

If the secondary of output transformer T2 begins to draw current above a certain predetermined level, transistor TR7 is rendered conducting to swtich the trigger to shut of transistor TR9 and render transistor TR8 conducting. This causes the relay to drop out, opening contacts RL1/1 and shutting off the oscillator, and consequently removing the high tension voltage from the output of the voltage multiplier. When transistor TR8 conducts, the relay also causes a further set of contacts namely, RL1/2 in the trigger circuit, to switch to a position shown in FIG. 4. As a result, the capacitor C6 in the trigger circuit charges and, on completion of charging, permits the non-conducting bias on the base of transistor TR7 to be reapplied to cause the trigger to switch back to its normal condition and restore circuit operation. This automatic restart, following the delay determined by capacitor C6, also causes the contacts RL1/2 to switch back to the alternative position to that shown in FIG. 4.

A voltmeter M1, which may be calibrated in terms of output voltage of the voltage multiplier, is connected between the voltage regulator and the supply lead of the oscillator to permit voltage readings to be taken; and a warning lamp LP1 is connected across the oscillator leads to indicate operation of the oscillator.

The circuit as illustrated is intended for supply from the mains through leads ML1 and 2 containing switch SW1 and input transformer T1. The primary of the input transformer T1 may have a warning lamp LP1 connected thereacross to indicate that the mains supply is on.

To describe the operation of the circuit, it will be assumed that, initially, the gun connected to the circuit is positioned in relation to any object by which the gun could be earthed, to leave the gun operating under its rated i.e. maximum, voltage, that is, at the largest distance by which, in practice, the gun is likely to be separated from such an object. In this condition, the stabilized outputs of the oscillator DR and the amplifier AMP1 are at a maximum. If the gun is then moved appreciably nearer to an earthing object, the instantaneous value of the current drawn by the gun would increase substantially. This causes a voltage signal to be developed across resistor R25 of the current sensing circuit, which is applied to regulator TR1 to reduce the output voltage of the amplifier AMP1 and thus restore the current to its former value. If then the gun is moved away from the earthing object, the reverse of the above described action takes place, again to restore the current value.

The above explanation assumes that the spray gun electrode does contact or nearly contact an object by which it could be earthed. If this happens, a current pulse is produced in the secondary WS2 of the output transformer T2 which would operate the overload control circuit. However, if that circuit is not plugged into the generator, the voltage regulator VR would still prevent any dangerous discharge of current. In the event of a failure of the voltage regulator in these circumstances, the overload control circuit would again respond to shut off power to the oscillator.

I claim:

1. A circuit for supplying an electrostatic spray gun with a rated high-tension voltage, the circuit comprising:

A. a high tension generator constituted by:
1. a radio-frequency oscillator;
2. a push-pull amplifier; and
3. a voltage multiplier and rectifier the oscillator and the amplifier being connected across a common potential supply, the oscillator being connected to the amplifier to drive the amplifier in the saturated mode, and the amplifier being connected to the voltage multiplier through a transformer the primary inductance of which is tuned by the combined effects of secondary capacitance and equivalent capacitance of the voltage multiplier; the arrangement being that the voltage multiplier develops the high tension for operating the electrostatic spray gun from the radio frequency input delivered to it from the amplifier through the transformer coupling;

B. a feedback loop comprising:
a current sensing means connected to the secondary of said transformer
coupling to sense any change in the instantaneous magnitude of the
current drawn by the voltage multiplier to produce a voltage signal
representative of that change; and C. a voltage regulator comprising a transistor connected in a supply rail of the amplifier in common base configuration with the base electrode connected to said current sensing means to receive said voltage signal therefrom; said voltage signal being such that, in response thereto, bias voltage on the transistor is varied to vary the voltage drop across the amplifier inversely with the change in the instantaneous magnitude of the current drawn by the voltage multiplier and thereby maintain the current flow through the voltage multiplier substantially constant.

2. A circuit according to claim 1, wherein the oscillator is formed as a separate unit for plug-in connection to the remainder of the generator.

3. A circuit according to claim 1, wherein said current sensing means comprises a resistor connected to the secondary of the transformer so as to develop a voltage signal thereacross in response to current drawn by the secondary of the transformer, and the voltage regulator comprises an amplifier driven by the signal voltage taken from the resistor.

4. A circuit according to claim 3, wherein the voltage regulator comprises a transistor connected to act as a common base amplifier.

5. A circuit according to claim 3, wherein said current sensing means comprises a D.C. amplifier to increase the sensitivity of the drive to the voltage regulator.

6. A circuit according to claim 1, wherein the circuit comprises an overload control responsive to the instantaneous value of current drawn by the spray gun at a predetermin ed level to shut off the power to the high-tension generator.

7. A circuit according to claim 6, wherein the circuit comprises relay contacts on opening of which the high tension generator is disabled, and the overload control comprises a relay to operate the contacts, and a Schmitt trigger responsive to the instantaneous value of current drawn by the spray gun at said predetermined level to switch to cause the relay and thereby the contacts to fall out.

8. A circuit according to claim 7, wherein the overload control comprises means for delaying resetting of the Schmitt trigger for a predetermined period.

9. A circuit according to claim 7, wherein the Schmitt trigger is connected to the secondary of said transformer through an amplifier.

10. A circuit according to claim 7, wherein the Schmitt trigger comprises a transistor pair, and said amplifier comprises a transistor connected with the normally off transistor of the trigger to form therewith a high-gain Darlington pair.

11. A circuit according to claim 6, wherein the overload control comprises means for automatically resetting the control, once operated, to restore operation of the high-tension generator.

12. A circuit according to claim 6, wherein the overload control is constituted as a separate circuit, and the high-tension generator provides plug-in connection for the circuit of the overload control.

13. A circuit according to claim 1, wherein the voltage and rectifier multiplier consists of a Cockroft Walton chain rectifier circuit.

14. A circuit according to claim 1, wherein said current sensing means is made up as a separate circuit, and the high-tension generator provides plug-in connections for the circuit.

15. A circuit according to claim 1, further comprising a full wave bridge rectifier to permit the circuit to be supplied from an a.c. mains supply.

16. A circuit according to claim 1, further comprising an overload control circuit comprising a resistor connected to develop a given signal thereacross when the current drawn by the gun exceeds a predetermined limit;
a first transistor the base of which is connected through a diode to said resistor to receive said signal;
a second transistor connected to said first transistor to form a Darlington pair therewith;
a third transistor connected to said second transistor to form a Schmitt trigger therewith;
a relay coil;
a fourth transistor for supplying power to the relay coil and having emitter and collector connected between the circuit supply lines and its base connected to the collector of said third transistor to be switched on when the Schmitt trigger fires;
a first switch having a contact which is operated by said relay coil and having three terminals cooperate therewith;
a capacitor connected between a circuit supply line and a first terminal of said first switch;
a resistor connected between said circuit supply line and a second terminal of said switch;
said switch having a third terminal connected to the base of said first transistor and having its contact normally positioned to connect said first and second terminals;
a second switch being a line switch to disconnect said oscillator from the circuit supply thereto and the contact of which is operated by said relay coil; whereby when said Schmitt trigger is fired by said signal developed across said resistor, the second switch is opened to disable the oscillator and said first switch is operated to move the contact thereof to connect said first and third terminals of said first switch to cause said capacitor to charge and cause a voltage to develop on the base of said first transistor to reset the Schmitt trigger.

* * * * *